United States Patent [19]

Fine

[11] Patent Number: 5,034,354
[45] Date of Patent: Jul. 23, 1991

[54] ALKALI-FREE MULTICHANNEL PLATE AND GLASS

[75] Inventor: Gerald J. Fine, Corning, N.Y.
[73] Assignee: Corning Incorporated, Corning, N.Y.
[21] Appl. No.: 524,006
[22] Filed: May 16, 1990
[51] Int. Cl.$^5$ .............................................. C03C 3/07
[52] U.S. Cl. ..................................... 501/74; 501/76; 65/3.15; 428/373
[58] Field of Search .................. 501/74, 76; 65/3.15, 65/4.3; 428/294, 373, 188, 428; 350/96.27

[56] References Cited

U.S. PATENT DOCUMENTS

| | | | |
|---|---|---|---|
| 3,551,171 | 12/1970 | Thomas | 501/74 |
| 3,627,550 | 12/1971 | Monneraye | 106/53 |
| 4,112,170 | 9/1978 | Rauscher | 428/212 |
| 4,629,486 | 12/1986 | Uchiyama | 65/3.15 |

Primary Examiner—William R. Dixon, Jr.
Assistant Examiner—Lisa M. Schull
Attorney, Agent, or Firm—Milton M. Peterson; Clinton S. Janes, Jr.

[57] ABSTRACT

There is disclosed a family of alkali-free, lead silicate glasses having properties that make them particularly suitable for use in producing perforated plates for such applications as multichannel plates. In addition to lead oxide and silica, the glasses contain ZnO, BaO, CaO and, under certain circumstances, MgO.

8 Claims, 1 Drawing Sheet

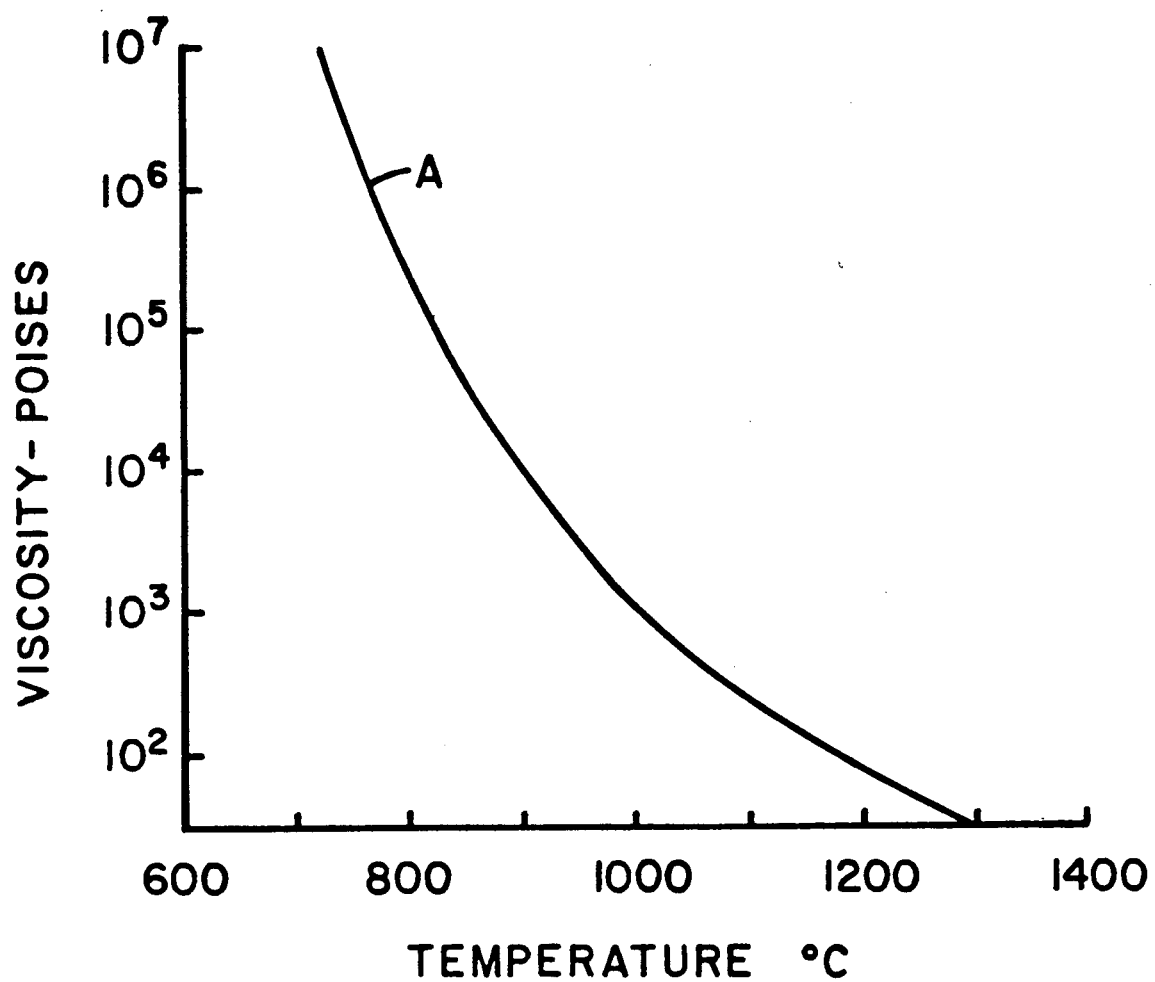

_5,034,354_

ALKALI-FREE MULTICHANNEL PLATE AND GLASS

FIELD OF THE INVENTION

The field of this invention is lead silicate glasses, and multichannel plates (MCPs) embodying such glasses.

BACKGROUND OF THE INVENTION

Microchannel plates (MCPs) are thin wafers of electrically conducting glass which contain thousands of open channels or tubes. Each channel diameter is on the order of 10 to 15 microns. The plates are used for the amplification of X-rays, ions, or electrons. They are an essential component of a variety of electronic devices, including night vision goggles.

The principles of microchannel plate fabrication and operation are described in detail in the literature. For example, see an article by Michael Lampton in Scientific American, 245, 62–71 (1981). A fabrication procedure in current use is described in detail in U.S. Pat. Nos. 4,629,486 (Uchiyama et al.) and 4,112,170 (Rauscher). The former is particularly concerned with alkali lead silicate cladding glasses; the latter with barium borosilicate core glasses.

Briefly, the method, as there described, involves fusing solid rods of a leachable core material, preferably glass, within tubular pieces of relatively non-leachable skin glass. A bundle of such composite bodies is formed and fusion sealed. The bundle is then drawn down, cut into lengths, rebundled and further drawn. Ultimately, a composite article is obtained in which an interconnected glass matrix of the skin glass encases an array of leachable core elements. The composite is then exposed to a leachant, for example, hydrochloric or nitric acid, to remove the cores. This leaves the skin glass matrix with an array of channels corresponding to the array of core elements. The channels may be on the order of ten microns in diameter. The perforated plate, thus formed, is then heated in a hydrogen-containing atmosphere to produce a surface layer of reduced metal on the channel walls. As used throughout, the term "perforated plate," or face plate, means a plate containing an array of channels, as just described.

A cladding glass, suitable for MCP production, must possess a particular combination of physical and electrical properties. Initially, the glass must have a liquidus viscosity suitable for drawing tubing. A viscosity in excess of 30,000 poises at the internal liquidus is acceptable. However, a viscosity over 100,000 poises is preferred.

Another requirement is compatibility with soluble core glasses. During microchannel plate fabrication, a soluble core glass is inserted inside the cladding glass tubing to maintain dimensional stability through redraw. The core glass is ultimately leached from the channels. As a consequence, any cladding glass requires lower softening point and thermal coefficient of expansion (CTE) than the soluble core glass, and about $10^4$ lower etch rate. Fortunately, a wide range of soluble core glasses is available, for example, those disclosed in the Rauscher patent mentioned earlier.

The glass must also have a suitable surface resistivity, a value of about $10^{13}$ ohms/sq. normally being desired. However, some variation can usually be tolerated, and surface resistivities between $10^{11}$ and $10^{14}$ ohms/square are considered acceptable. Typically, a lead silicate glass is employed, and fired in hydrogen at 400–500° C. to obtain an appropriate surface resistivity.

A key consideration, of course, is a high secondary electron emission constant. As a practical matter, the stability of the secondary emission is of even greater significance. That determines the useful life of an MCP device.

In the past, alkali lead silicate glasses have been widely used in MCPs. Stability of secondary electron emission was a problem, however, leading to shortened life. Studies at Mullard Research Laboratories in England have shown that ion migration may affect stability. Accordingly, efforts have been made to substitute larger alkali ions, such as cesium or rubidium, for smaller ions, such as potassium and sodium, in the lead silicate glass composition. While this appears to have helped, the problem still persists.

Outgassing of both $H_2$ and $CO_2$ during MCP usage is a primary cause of reduced signal/noise. This is primarily because the products of outgassing are accelerated inside individual MCP channels due to the electric field. This results in spurious electronic emission.

To eliminate outgassing, MCPs are generally heated at relatively high temperatures prior to installation in a device. A possible solution, then, is to provide a harder MCP glass, that is, a glass that softens at higher temperatures. Such a glass would permit higher heat treating temperatures. This should increase gas diffusion from the glass, and, consequently, reduce outgassing in use.

PURPOSES OF THE INVENTION

A basic purpose is to provide a family of novel, lead silicate glasses.

A particular purpose is to provide such glasses that are free of alkali metal oxides.

Another purpose is to provide such glasses having properties adapted to tube drawing.

Still another purpose is to provide such glasses having softening points greater than 650° C. to permit bake-out at temperatures higher than can be used with existing glasses.

A further purpose is provide such lead silicate glasses capable of being drawn as cladding glasses in conjunction with soluble, core glass rods to produce a multichannel plate blank.

A still further purpose is to provide a perforated glass plate for a multichannel plate having improved and more stable secondary emission characteristics.

SUMMARY OF THE INVENTION

One aspect of my invention is an alkali-free, lead silicate glass consisting essentially of, as calculated from the batch on an oxide basis in percent by weight, 28–40% $SiO_2$, 42–55% $PbO$, 6–14% $BaO$, 2–8% $ZnO$, 1–5% $CaO$, 0–2% $MgO$, 0–5% $Al_2O_3$ and 0–1.5% $Sb_2O_3$. In one preferred embodiment, the composition contains at least 0.1%, and preferably at least 0.5%, MgO only when the CaO+BaO content is not over 12%. In another, the glass has a softening point over 650° C, preferably over 675° C., and a viscosity at the liquidus temperature over 30,000 poises.

Another aspect of the invention is a fusion-welded bundle composed of a plurality of soluble core rods encompassed in a continuous, lead silicate glass matrix, the glass matrix being alkali-free and having a composition as defined above. In one embodiment, the soluble core rods are composed of a glass, preferably having a solution rate at least $10^4$ times that of the matrix glass.

A further aspect of the invention is a perforated glass plate wherein the glass is an alkali-free lead silicate having a composition as defined above. In embodiments, the perforated walls have elemental lead formed thereon, have a surface resistivity in the range of $10^{11}$ to $10^{14}$ ohms/square, preferably about $10^{13}$ ohms/square, and the perforated plate is a component in a multichannel plate device.

PRIOR ART

The following United States Patents are of interest insofar as they disclose lead silicate glasses used for various purposes:

U.S. Pat. No. 4,629,486 (Uchiyama et al.) describes the fabrication of microchannel plates by forming a bundle of clad fibers from a soluble core glass and an insoluble cladding glass. The cladding glass contains 35–50 $SiO_2$, 1–3 $Na_2O$, 1–5 $K_2O$, 0–2 $Li_2O$, 1–5 MgO, 0–5 CaO, 30–55 PbO and 0.5–7 $ZrO_2$. The use of MgO and CaO is taught to reduce gain and thus extend life. The glass is not alkali-free and does not contain BaO or ZnO.

U.S. Pat. No. 3,627,550 (Monneraye) describes a process similar to that of the Uchiyama et al. patent, but using molybdenum wire as the soluble core material. Further, it discloses a bismuth lead silicate glass for the matrix or cladding glass. The latter contains 35–50 $SiO_2$, 0–10 $B_2O_3$, 1–3.5 $Al_2O_3$, 2–4 $Na_2O$, 0–4 $K_2O$, 0–6 CaO+SrO+MgO, 5–6.5 ZnO, 25–30 PbO and 10–12 $Bi_2O_3$. This glass does contain alkali metal oxides and $Bi_2O_3$, is low in PbO, and has no BaO.

U.S. Pat. No. 4,609,632 (Sack) discloses alkali-free glasses having electrical properties that make them useful as insulators in ozone generators. The glasses are aluminoborosilicates that contain PbO and alkaline earth metal oxides. They are in a different glass family and designed for a different purpose.

U.S. Pat. No. 4,391,916 (Nakagawa et al.) discloses alkali-free glasses for use in producing a photoetching mask. These are $RO-PbO-Al_2O_3-SiO_2$ glasses. They are designed for a different purpose, and have high contents of CaO and MgO, no BaO, and a low PbO content.

U.S. Pat. No. 4,542,105 (Furukawa et al.) discloses a vitreous passivating coating for semiconductors. The composition range is 35–45 $SiO_2$, 3–8 $Al_2O_3$, 1–10 $B_2O_3$, 10–30 ZnO, 5–30 PbO and 5–20 MgO+CaO+SrO+BaO. This is an aluminoborosilicate that has a high ZnO content and a low PbO content.

U.S. Pat. No. 2,469,867 (Danzin) discloses radio tube glasses that have a low coefficient of thermal expansion and a softening temperature of at least 600° C. They are aluminoborosilicate glasses that contain RO and PbO, but also contain $Na_2O$ and are relatively low in PbO.

U.S. Pat. No. 4,112,170 (Rauscher) discloses barium borosilicate glasses suitable for soluble core glasses. It is incorporated herein for such showing.

BRIEF DESCRIPTION OF THE DRAWING

The single FIGURE in the drawing is a graphical representation of the viscosity-temperature characteristics of a preferred embodiment of the invention.

GENERAL DESCRIPTION OF THE INVENTION

My invention provides a family of novel, lead silicate glasses. These glasses are particularly adapted to being drawn as tubing to be used in forming fusion-sealed bundles. The bundles, after redrawing, provide perforated plates such as used in multichannel plates (MCPs).

Heretofore, it has been common commercial practice to use alkali lead silicate tubing as the cladding or matrix glass in producing perforated plates. The present glasses differ significantly in that they are free of alkali metal oxides ($R_2O$) Instead, they contain limited amounts of alkaline earth metal oxides (RO), lead oxide (PbO), zinc oxide (ZnO) and, optionally, alumina ($Al_2O_3$)

As a result my glasses are harder than previously used alkali lead silicates, that is, soften at higher temperatures. This permits baking out a perforated plate at a higher temperature. Subsequent outgassing in service, and consequent noise level in a MCP, are thus diminished. Also, the absence of alkali metals minimizes ion migration, and, thus, should provide a more stable secondary electron emission level, and a longer service life.

The present glass composition family, as calculated in percent by weight on an oxide basis from the glass batch, consists essentially of 28–40% $SiO_2$, 42–55% PbO, 6–14% BaO, 2–8% ZnO, 1–5% CaO, 0–2% MgO, 0–5% $Al_2O_3$ and 0–1.5% $Sb_2O_3$. A particular feature is the use of RO and ZnO as glass modifiers, rather than $R_2O$ as heretofore.

In general, the specified oxide ranges must be carefully observed to maintain an adequate viscosity at the liquidus temperature for successful tube drawing. Typically, compositions outside the indicated ranges have liquidus temperatures which render the glasses incompatible with drawing tubing from the glass melt.

It has further been found that, if the total content of CaO +BaO does not exceed about 12%, it is desirable to have both MgO and CaO present. At low levels of alkaline earths, three alkaline earths are apparently required to maintain low liquidus temperatures. CaO is far less deleterious to liquidus temperature than MgO, thus resulting in a wider range of acceptable CaO levels. At higher levels of alkaline earths, only two are required, and, MgO is not acceptable.

A number of observations have also been made on the effect of glass composition on surface resistivity. Obviously, as the concentration of lead in the glass increases, surface resistivity decreases. Surprisingly, however, the concentration of alkaline earths in the glass also seems to exert an effect on surface resistivity. High concentrations of alkaline earth oxides appear to increase surface resistivity, presumably by filling holes in the silicate network.

SPECIFIC EMBODIMENTS

The invention is further illustrated with reference to TABLE 1 below which sets forth several glass compositions within the family of the invention. The compositions are presented in parts by weight (the total approximating 100) as calculated on the oxide basis Glasses having these compositions were melted, and properties measured, as shown. The glasses had values for viscosity (visc.) at the liquidus, and for internal liquidus (liq.) that were suitable for drawing tubing, had electrical resistivities (E.R.) between $10^{11}$ and $10^{14}$ ohms/square after $H_2$-firing, had softening points (soft.pt) in excess of 650° C, were alkali-free, and contained some combination of alkaline earth oxides (RO).

All of the glasses were melted in Pt crucibles at 1450° C. for 4 hours, poured into 4"×4" or 6'×6" molds, and annealed overnight. In order to maintain oxidizing conditions, ammonium nitrate was typically added to the batch. Standard physical properties, such as softening point, CTE, and liquidus, were measured using standard techniques. Surface resistivities were measured on an apparatus specially designed by Varian Electro-Optics of Palo Alto, CA.

TABLE 1

|  | 1 | 2 | 3 | 4 | 5 |
|---|---|---|---|---|---|
| $SiO_2$ | 34.9 | 31.4 | 38.7 | 36.4 | 36.1 |
| PbO | 52.5 | 50.5 | 44.2 | 44.3 | 43.9 |
| $Al_2O_3$ | — | — | 3.2 | 3.2 | 3.2 |
| MgO | 0.8 | — | 0.8 | 0.8 | 0.8 |
| CaO | 1.1 | 2.0 | 1.2 | 3.5 | 1.2 |
| BaO | 7.2 | 12.5 | 8.0 | 8.0 | 7.9 |
| ZnO | 3.1 | 2.9 | 3.4 | 3.4 | 6.7 |
| $Sb_2O_3$ | 0.3 | 0.3 | 0.4 | — | — |
| Soft. Pt. (°C.) | 684 | 681 | 755 | 737 | 732 |
| CTE ($\times 10^{-7}$/°C.) | 68.2 | 73.8 | 55.8 | 65.4 | 59.1 |
| Liq. (°C.) | 801 | 747 | 917 | 881 | 849 |
| Visc. (poises) | $1 \times 10^5$ | $2 \times 10^6$ | $5 \times 10^4$ | $7 \times 10^4$ | $2 \times 10^5$ |
| E.R. (ohms/sq.) | — | $1 \times 10^{11}$ | $6 \times 10^{11}$ | $5 \times 10^{13}$ | $6 \times 10^{12}$ |

The graphical representation in the attached drawing plots glass viscosity versus glass temperature. The single curve is the viscosity-temperature curve for Example 2 in TABLE 1. The glass liquidus is shown by point A on the curve.

TABLE 2, below, sets forth compositions for several glasses that fall outside the ranges of the present invention. These glasses do not exhibit the physical property values required of glasses within the invention. Thus, they illustrate the criticality of the characteristic composition ranges of the invention.

Glasses 6 and 7 are prior alkali lead silicates cited as preferred examples in the Rauscher patent. Glasses 8-13 were melted and measured as described with respect to the glasses of TABLE 1. However, their compositions fall outside the claimed ranges.

TABLE 2

|  | 6 | 7 | 8 | 9 | 10 |
|---|---|---|---|---|---|
| $SiO_2$ | 39.0 | 47.0 | 35.0 | 34.5 | 34.8 |
| PbO | 50.7 | 45.0 | 52.6 | 42.1 | 52.3 |
| MgO | — | — | 1.5 | — | — |
| CaO | — | — | — | 5.6 | 2.1 |
| BaO | 2.0 | — | 7.2 | 13.7 | 7.2 |
| ZnO | — | — | 3.1 | 3.2 | 3.1 |
| $K_2O$ | 5.3 | 8.0 | — | — | — |
| $Rb_2O$ | 2.0 | — | — | — | — |
| $Sb_2O_3$ | — | — | 0.4 | 0.4 | 0.4 |
| Soft. Pt. (°C.) | 596 | 650 | 687 | 720 | 687 |
| CTE ($\times 10^{-7}$/°C.) | 88.1 | 82.7 | 64.2 | 77.0 | 66.9 |
| Liq. (°C.) | — | — | 1000 | 1011 | 947 |
| Visc. (poises) | — | — | $3 \times 10^3$ | $1 \times 10^4$ | $7 \times 10^3$ |

|  | 11 | 12 | 13 |
|---|---|---|---|
| $SiO_2$ | 33.6 | 37.0 | 33.5 |
| PbO | 45.4 | 52.2 | 50.4 |
| MgO | 1.6 | — | — |
| CaO | 2.2 | — | — |
| BaO | 13.4 | 7.2 | 12.5 |
| ZnO | 3.2 | 3.1 | 2.9 |
| $Sb_2O_3$ | 0.4 | 0.4 | 0.4 |
| Soft. Pt. (°C.) | 698 | 684 | 675 |
| CTE ($\times 10^{-7}$/°C.) | 75.3 | 70.4 | 70.6 |
| Liq. (°C.) | 917 | 1176 | 862 |
| Visc. (poises) | $1 \times 10^4$ | $2 \times 10^2$ | $2 \times 10^4$ |

I claim:

1. An alkali-free, lead silicate glass consisting essentially of, as calculated from the batch on an oxide basis in percent by weight, 28-40% $SiO_2$, 42-55% PbO, 6-14% BaO, 2-8% ZnO, 1-5% CaO, 0-2% MgO, 0-5% $Al_2O_3$ and 0-1.5% $Sb_2O_3$, the glass softening point being over 650° C. and the viscosity at the liquidus temperature being over 30,000 poises.

2. A lead silicate glass in accordance with claim 1 wherein the composition contains MgO when the CaO+BaO content is not over 12%.

3. A fusion-welded bundle composed of a matrix glass and a plurality of soluble glass core rods that dissolve in a solvent at a rate at least $10^4$ times as fast as the matrix glass, and that are encompassed in a continuous, lead silicate glass matrix, the glass matrix being alkali-free and consisting essentially of, as calculated on an oxide basis in weight percent from the batch, 28-40% $SiO_2$, 42-55% PbO, 6-14% BaO, 2-8% ZnO, 1-5% CaO, 0-2% MgO, 0-5% $Al_2O_c$ and 0-1.5% $Sb_2O_3$, the matrix glass softening point being over 650° C. and the viscosity at the liquidus temperature being over 30,000 poises.

4. A fusion-welded bundle in accordance with claim 3 wherein the glass matrix contains MgO when the CaO+BaO content is not over 12%.

5. A glass plate containing an array of channels wherein the glass is an alkali-free lead silicate consisting essentially of, as calculated on an oxide basis in weight percent from the batch 28-40% $SiO_2$, 42-55% PbO, 6-14% BaO, 2-8% ZnO, 1-5% CaO, 0-2% MgO, 0-5% $Al_2O_3$, and 0-1.5% $Sb_2O_3$, the glass softening point being over 650° C. and the viscosity at the liquidus temperature being over 30,000 poises.

6. A glass plate in accordance with claim 5 wherein the walls of the array of channels have elemental lead formed thereon by hydrogen firing.

7. A glass plate in accordance with claim 6 wherein the surface resistivity is between $10^{11}$ and $10^{14}$ ohms/square.

8. A perforated glass plate in accordance with claim 7 wherein the surface resistivity is about $10^{13}$ ohms/square.

* * * * *